US012406800B2

(12) United States Patent
Koizumi et al.

(10) Patent No.: US 12,406,800 B2

(45) Date of Patent: Sep. 2, 2025

(54) MULTILAYER COIL COMPONENT

(71) Applicant: Murata Manufacturing Co., Ltd., Kyoto-fu (JP)

(72) Inventors: Kazuya Koizumi, Nagaokakyo (JP); Atsuo Hirukawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 724 days.

(21) Appl. No.: 17/747,822

(22) Filed: May 18, 2022

(65) Prior Publication Data

US 2022/0277889 A1 Sep. 1, 2022

Related U.S. Application Data

(63) Continuation of application No. PCT/JP2020/040422, filed on Oct. 28, 2020.

(30) Foreign Application Priority Data

Nov. 26, 2019 (JP) ................................ 2019-213394

(51) Int. Cl.
*H01F 27/29* (2006.01)
*H01F 17/00* (2006.01)
(Continued)

(52) U.S. Cl.
CPC ....... *H01F 27/292* (2013.01); *H01F 17/0013* (2013.01); *H01F 27/324* (2013.01); *H01F 27/34* (2013.01)

(58) Field of Classification Search
CPC .. H01F 27/292; H01F 17/0013; H01F 27/324; H01F 27/34
See application file for complete search history.

(56) References Cited

U.S. PATENT DOCUMENTS

2002/0057174 A1 5/2002 Uchikoba et al.
2012/0169444 A1* 7/2012 Son .................... H01F 17/0013 156/89.12

(Continued)

FOREIGN PATENT DOCUMENTS

JP 2000223340 A * 8/2000
JP 2001-332434 A 11/2001

(Continued)

OTHER PUBLICATIONS

International Search Report issued in PCT/JP2020/040422; mailed Jan. 19, 2021.

*Primary Examiner* — Malcolm Barnes
(74) *Attorney, Agent, or Firm* — Studebaker Brackett PLLC

(57) ABSTRACT

A multilayer coil component includes a multilayer body including laminated insulating layers, a coil including electrically connecting coil conductors laminated together with the insulating layers, and first and second outer electrodes electrically connected to the coil. The body has first and second end surfaces opposing each other in a length direction in which the first and second outer electrodes face each other, first and second main surfaces opposing each other in a height direction orthogonal to the length direction, and first and second side surfaces opposing each other in a width direction orthogonal to the length direction and the height direction. The second main surface is a mounting surface. A lamination direction of the body and a coil axis of the coil are along the length direction, and a relationship between a length dimension L and a width dimension W of the body is L/W<1.

9 Claims, 6 Drawing Sheets

(51) Int. Cl.
*H01F 27/32* (2006.01)
*H01F 27/34* (2006.01)

(56) References Cited

U.S. PATENT DOCUMENTS

| | | | | |
|---|---|---|---|---|
| 2012/0326827 | A1* | 12/2012 | Nanjyo | H01F 17/0033 336/200 |
| 2016/0293301 | A1* | 10/2016 | Choto | H01F 17/0013 |
| 2018/0166206 | A1* | 6/2018 | Ueyama | H01F 17/0013 |

FOREIGN PATENT DOCUMENTS

| | | | |
|---|---|---|---|
| JP | 2005-294637 | A | 10/2005 |
| JP | 2012-195471 | A | 10/2012 |
| JP | 2013-254977 | A | 12/2013 |
| JP | 2014027071 | A | * 2/2014 |

* cited by examiner

MULTILAYER COIL COMPONENT

CROSS-REFERENCE TO RELATED APPLICATIONS

This application claims benefit of priority to International Patent Application No. PCT/JP2020/040422, filed Oct. 28, 2020, and to Japanese Patent Application No. 2019-213394, filed Nov. 26, 2019, the entire contents of each are incorporated herein by reference.

BACKGROUND

Technical Field

The present disclosure relates to a multilayer coil component.

Background Art

As described in Japanese Unexamined Patent Application Publication No. 2013-254977, for example, a multilayer coil component includes a multilayer body formed by laminating a plurality of insulating layers, two outer electrodes that are extended in a lamination direction of the multilayer body and are provided on side surfaces of the multilayer body facing each other, and a plurality of coil conductors that is laminated together with the insulating layers to form a coil and that overlaps each other to form an annular raceway when viewed in a plan view from the lamination direction.

SUMMARY

In recent years, as the communication speed of electrical devices has increased and the size of the electrical devices has decreased, there is accordingly a need for a multilayer coil component that has sufficient high-frequency characteristics in a high frequency band (for example, a GHz band of 1 GHz or more).

However, the configuration of the disclosure described in Japanese Unexamined Patent Application Publication No. 2013-254977 has had a problem that impedance characteristics in a high frequency region are insufficient.

In addition, after the multilayer coil component is mounted, there has been a problem that the multilayer coil component has insufficient resistance to deflection.

Accordingly, the present disclosure provides a multilayer coil component having good high-frequency characteristics and high resistance to deflection.

A multilayer coil component according to the present disclosure is a multilayer coil component characterized by including a multilayer body that is formed by laminating a plurality of insulating layers and has a coil built inside the multilayer body; and a first outer electrode and a second outer electrode that are electrically connected to the coil. The coil is formed by electrically connecting a plurality of coil conductors laminated together with the insulating layers. The multilayer body has a first end surface and a second end surface oppose each other in a length direction in which the first outer electrode and the second outer electrode face each other, a first main surface and a second main surface oppose each other in a height direction orthogonal to the length direction, and a first side surface and a second side surface oppose each other in a width direction orthogonal to the length direction and the height direction. The second main surface is a mounting surface. A lamination direction of the multilayer body and a coil axis of the coil are along the length direction, and a relationship between a length dimension L which is a dimension of the multilayer body in a length direction and a width dimension W which is a dimension of the multilayer body in a width direction is $L/W<1$.

According to the present disclosure, it is possible to provide a multilayer coil component having good high-frequency characteristics and high resistance to deflection.

DETAILED DESCRIPTION

Hereinafter, a multilayer coil component of the present disclosure will be described.

However, the present disclosure is not limited to the following embodiments, and can be appropriately modified and applied without departing from the scope of the present disclosure. Note that a combination of two or more of the individual desirable configurations described below is also the present disclosure.

Figure 1:
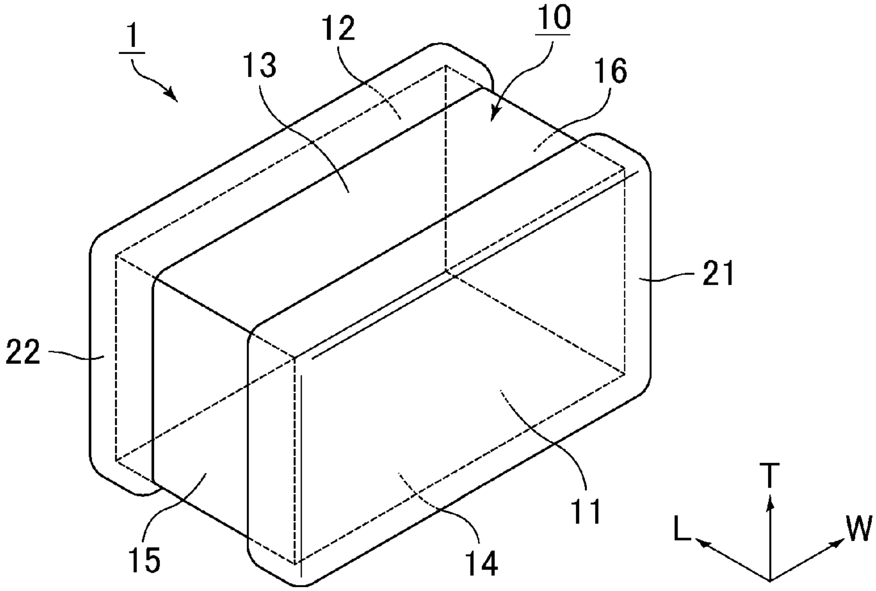
FIG. 1 is a perspective view schematically illustrating an example of a multilayer coil component of the present disclosure.

FIG. 1 is a perspective view schematically illustrating an example of a multilayer coil component of the present disclosure.

Figure 2:
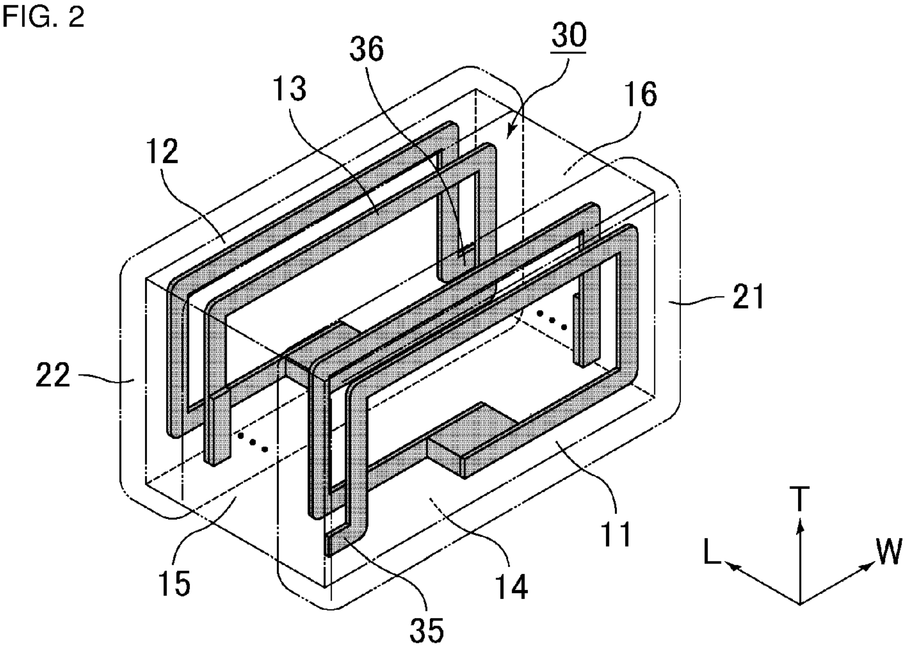
FIG. 2 is a perspective view schematically illustrating an example of a multilayer body configuring the multilayer coil component of the present disclosure.

FIG. 2 is a perspective view schematically illustrating an example of a multilayer body configuring the multilayer coil component of the present disclosure. FIG. 2 schematically illustrates the inside of the multilayer coil component by seeing therethrough so that the structure of a coil of the multilayer coil component can be seen.

A multilayer coil component 1 illustrated in FIG. 1 includes a multilayer body 10, a first outer electrode 21, and a second outer electrode 22. The multilayer body 10 has a substantially rectangular parallelepiped shape having six faces. Although the configuration of the multilayer body 10 will be described later, the multilayer body 10 is formed by laminating a plurality of insulating layers and has a coil built inside thereof. Each of the first outer electrode 21 and the second outer electrode 22 is electrically connected to the coil.

In the multilayer coil component and the multilayer body described in this specification, a direction in which the first outer electrode and the second outer electrode face each other is referred to as a length direction. A direction orthogonal to the length direction is defined as a height direction, and a direction orthogonal to the length direction and the height direction is defined as a width direction.

In FIG. 1 and FIG. 2, a length direction, a width direction, and a height direction of the multilayer coil component and the multilayer body are indicated as an L direction, a W direction, and a T direction by double-headed arrows, respectively.

The length direction (L direction), the width direction (W direction), and the height direction (T direction) are orthogonal to each other.

A mounting surface of the multilayer coil component 1 is a surface (LW plane) parallel to the length direction and the width direction.

The multilayer body 10 illustrated in FIG. 1 and FIG. 2 has a first end surface 11 and a second end surface 12 opposing each other in the length direction, a first main surface 13 and a second main surface 14 opposing each other in the height direction orthogonal to the length direction, and a first side surface 15 and a second side surface 16 opposing each other in the width direction orthogonal to the length direction and the height direction.

Although not illustrated in FIG. 1 and FIG. 2, the multilayer body 10 is preferably rounded at its corner portion and ridge portion. The corner portion is a portion where three surfaces of the multilayer body intersect each other, and the ridge portion is a portion where two surfaces of the multilayer body intersect each other.

As illustrated in FIG. 1, the first outer electrode 21 is arranged to cover the first end surface 11 of the multilayer body 10, extend from the first end surface 11, and cover a part of the first main surface 13, a part of the second main surface 14, a part of the first side surface 15, and a part of the second side surface 16. As illustrated in FIG. 1, the second outer electrode 22 is arranged to cover the second end surface 12 of the multilayer body 10, extend from the second end surface 12, and cover a part of the first main surface 13, a part of the second main surface 14, a part of the first side surface 15, and a part of the second side surface 16.

The second main surface 14 serves as a mounting surface.

The coil is formed by electrically connecting a plurality of coil conductors laminated together with insulating layers.

A lamination direction of the multilayer body, which is a direction in which the plurality of insulating layers is laminated, is along the length direction. Further, a coil axis of the coil extends along the length direction.

In addition, it is preferable that the coil conductor and the first outer electrode be electrically connected to each other on the first side surface, and the coil conductor and the second outer electrode be electrically connected to each other on the second side surface.

FIG. 2 illustrates a state where the coil conductor configuring a coil 30 and the first outer electrode 21 are electrically connected to each other on the first side surface 15, and the coil conductor and the second outer electrode 22 are electrically connected to each other on the second side surface 16. A conductor that extends the coil 30 to the first side surface 15 is an extended conductor 35, and a conductor that extends the coil 30 to the second side surface 16 is an extended conductor 36.

A connection position between the coil conductor and the outer electrode can be changed by changing a position at which the coil conductor is extended out of the multilayer body. The coil conductor and the outer electrode may be electrically connected to each other on the main surface or the end surface of the multilayer body by changing an extending position.

In the multilayer coil component of the present disclosure, a relationship between a length dimension L which is a dimension in the length direction of the multilayer body and a width dimension W which is a dimension in the width direction thereof is $L/W<1$.

That is, the length dimension of the multilayer body is smaller than the width dimension thereof.

Further, the relationship between the length dimension L and the width dimension W of the multilayer body is preferably $L/W\leq 0.7$.

In addition, it is preferable that a relationship between the length dimension L which is the dimension in the length direction of the multilayer body and a height dimension T which is a dimension in the height direction be $L/T\geq 0.7$ and $L/T\leq 1.3$.

In addition, it is also preferable that $L=T$.

The length dimension of the multilayer body is preferably equal to or more than 0.61 mm and preferably equal to or less than 0.91 mm (i.e., from 0.61 mm to 0.91 mm).

The width dimension of the multilayer body is preferably equal to or more than 1.41 mm, and preferably equal to or less than 1.71 mm (i.e., from 1.41 mm to 1.71 mm).

The height dimension of the multilayer body is preferably equal to or more than 0.61 mm, and preferably equal to or more than 0.91 mm (i.e., from 0.61 mm to 0.91).

With respect to the relationship between the length dimension L and the width dimension W of the multilayer body, when the length dimension L of the multilayer body is smaller than the width dimension W, the impedance characteristic in the high-frequency region is good.

This is because stray capacitance generated between the outer electrode and the coil conductor inside the multilayer body can be reduced. This will be described with reference to the drawings.

Figure 3:
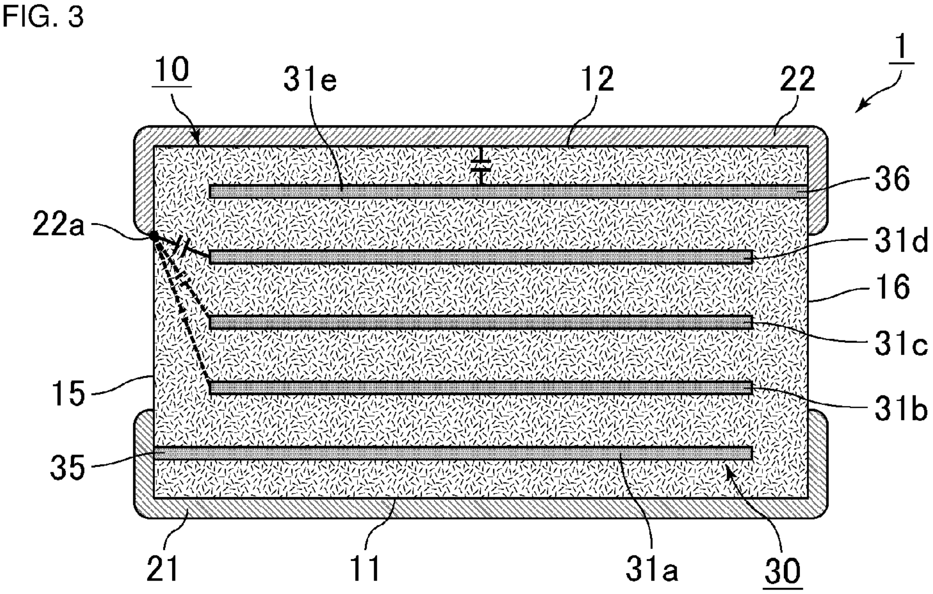
FIG. 3 is an LW sectional view schematically illustrating an internal structure of the multilayer coil component of the present disclosure.

FIG. 3 is an LW sectional view schematically illustrating the internal structure of the multilayer coil component of the present disclosure.

FIG. 3 illustrates the second outer electrode 22 and coil conductors (**31*a*, 31*b*, 31*c*, 31*d*, 31*e*) configuring the coil 30. Each of the coil conductors 31*a*, 31*b*, 31*c*, 31*d*, and 31*e* represents one turn of the coil conductor, and illustration of a connection conductor that connects between one turn and one turn of the coil conductor is omitted in FIG. 3**.

In FIG. 3, the magnitude of stray capacitance generated between each coil conductor and the second outer electrode 22 is schematically indicated by a circuit symbol of a capacitor.

In the case where the stray capacitance generated between the coil conductor and the outer electrode is large, the circuit symbol of the capacitor is illustrated large and thick, and in the case where the stray capacitance generated between the coil conductor and the outer electrode is small, the circuit symbol of the capacitor is illustrated small and thin. Further, in the case where the stray capacitance generated between the coil conductor and the outer electrode is negligibly small, the circuit symbol of the capacitor is indicated by a dotted line.

The stray capacitance generated between the second outer electrode and the coil conductor increases as the distance between the second outer electrode and the coil conductor decreases, and increases as the potential difference between the second outer electrode and the coil conductor increases.

Among the coil conductors, the coil conductor 31*e* connected to the second outer electrode 22 by the extended conductor 36 is close to the second outer electrode 22 present on the second end surface 12 of the multilayer body, and the stray capacitance is generated between the coil conductor 31*e* and the second outer electrode 22.

On the other hand, the other coil conductors 31*a*, 31*b*, 31*c*, and 31*d* are closest to the second outer electrode 22 present at an end portion of the first side surface 15 or the second side surface 16.

Here, considering the distances between the second outer electrode 22 and the respective coil conductors on the first side surface 15 side on the left side of the drawing, the distances between the second outer electrode 22 and the respective coil conductors are the shortest at an end point of the second outer electrode, which is indicated by a point 22*a* of the second outer electrode 22.

Although the stray capacitance is slightly generated in the coil conductor 31*d* located closer to the second outer electrode 22 in the width direction, the stray capacitance is reduced in the coil conductor 31*c* located at the center in the width direction because the coil conductor 31*c* is more distant from the second outer electrode 22. Since the coil conductor 31*b* located closer to the first outer electrode 21 in the width direction is farther from the second outer electrode 22, the stray capacitance is further reduced. Since the coil conductor 31*a* connected to the first outer electrode 21 by the extended conductor 35 is farthest from the second outer electrode 22, the stray capacitance is minimized.

As the stray capacitance generated between the second outer electrode 22 and the coil conductor, substantially only the stray capacitance between the coil conductor 31*e* and the second outer electrode 22 and the stray capacitance between the coil conductor 31*d* and the second outer electrode 22, which are indicated by the solid line in the circuit symbol of the capacitor, may be considered, and the stray capacitance generated between the other coil conductors and the second outer electrode 22 is negligibly small.

In addition, regarding the potentials of the coil conductors (31*a*, 31*b*, 31*c*, 31*d*, 31*e*) configuring the coil 30, the potential of the coil conductor 31*e* connected to the second outer electrode 22 is close to the potential of the second outer electrode 22, and the potential of the coil conductor 31*a* connected to the first outer electrode 21 is close to the potential of the first outer electrode 21.

Therefore, the potential difference between the coil conductor 31*e* and the second outer electrode 22 is the smallest, and the potential difference between the coil conductor 31*d* and the second outer electrode 22 is the second smallest.

Since the stray capacitance decreases as the potential difference decreases, the stray capacitance between the coil conductor 31*e* and the second outer electrode 22 and the stray capacitance between the coil conductor 31*d* and the second outer electrode 22 do not increase so much.

As described above, the stray capacitance generated between the second outer electrode 22 and the coil conductor is reduced as a whole.

The stray capacitance generated between the first outer electrode 21 and the coil conductor is also reduced as a whole for the same reason.

Therefore, a multilayer coil component in which the relationship between the length dimension L which is the dimension in the length direction of the multilayer body and the width dimension W which is the dimension in the width direction is $L/W<1$ can be a multilayer coil component having good impedance characteristics in the high-frequency region.

For comparison with the multilayer coil component of the present disclosure, generation of the stray capacitance in a multilayer coil component having a different structure will be described.

Figure 4:
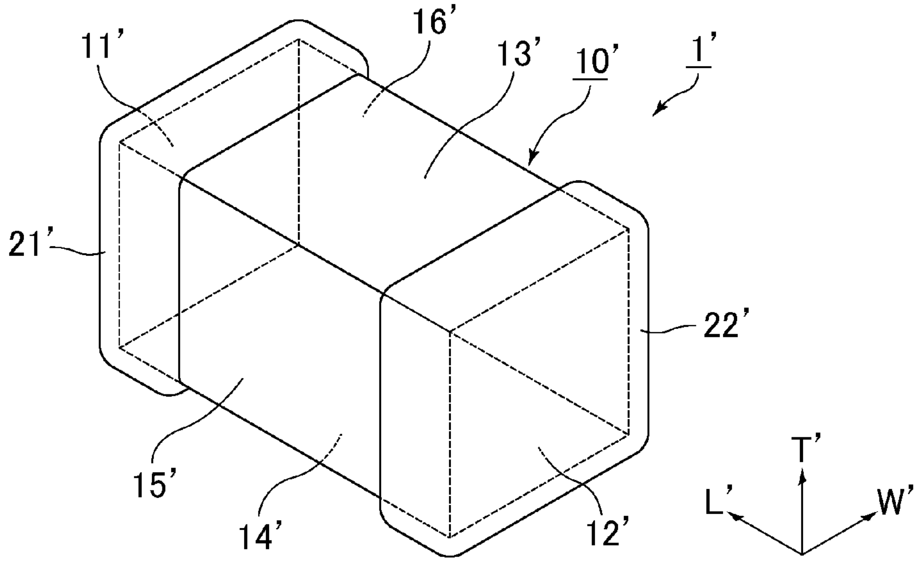
FIG. 4 is a perspective view schematically illustrating an example of a multilayer coil component for comparison.

FIG. 4 is a perspective view schematically illustrating an example of a multilayer coil component for comparison.

Figure 5:
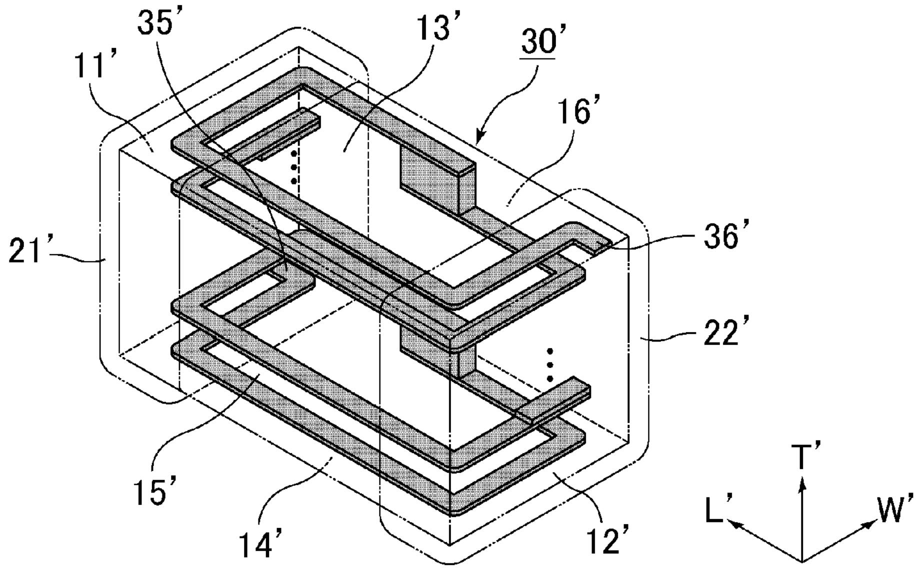
FIG. 5 is a perspective view schematically illustrating an example of a multilayer body configuring the multilayer coil component for comparison.

FIG. 5 is a perspective view schematically illustrating an example of a multilayer body configuring the multilayer coil component for comparison.

A multilayer coil component 1' for comparison illustrated in FIG. 4 includes a multilayer body 10', a first outer electrode 21', and a second outer electrode 22'. The multilayer body 10' has a substantially rectangular parallelepiped shape having six faces.

A direction in which the first outer electrode 21' and the second outer electrode 22' face each other is a length direction (L' direction), a direction orthogonal to the length direction is a height direction (T' direction), and a direction orthogonal to the length direction and the height direction is a width direction (W direction).

In FIG. 4 and FIG. 5, a length direction, a width direction, and a height direction of the multilayer coil component and the multilayer body are indicated as an L' direction, a W' direction, and a T' direction by double-headed arrows, respectively.

The mounting surface of the multilayer coil component 1' is a surface (L'W plane) parallel to the length direction and the width direction.

The multilayer body 10' illustrated in FIG. 4 and FIG. 5 has a first end surface 11' and a second end surface 12' opposing each other in the length direction, a first main surface 13' and a second main surface 14' opposing each other in the height direction orthogonal to the length direction, and a first side surface 15' and a second side surface 16' opposing each other in the width direction orthogonal to the length direction and the height direction.

As illustrated in FIG. 4, the first outer electrode 21' is arranged to cover the first end surface 11' of the multilayer body 10', extend from the first end surface 11', and cover a part of the first main surface 13', a part of the second main surface 14', a part of the first side surface 15', and a part of the second side surface 16'. As illustrated in FIG. 4, the second outer electrode 22' is arranged to cover the second end surface 12' of the multilayer body 10', extend from the second end surface 12', and cover a part of the first main surface 13', a part of the second main surface 14', a part of the first side surface 15', and a part of the second side surface 16'.

The second main surface 14' serves as a mounting surface.

In the multilayer coil component 1' for comparison, the relationship between the length dimension L' which is the dimension in the length direction of the multilayer body and the width dimension W' which is the dimension in the width direction thereof is $L'/W'>1$.

That is, the length dimension of the multilayer body is larger than the width dimension thereof.

The stray capacitance generated between the outer electrode and the coil conductor inside the multilayer body in such a case will be described with reference to FIG. 6.

Figure 6:
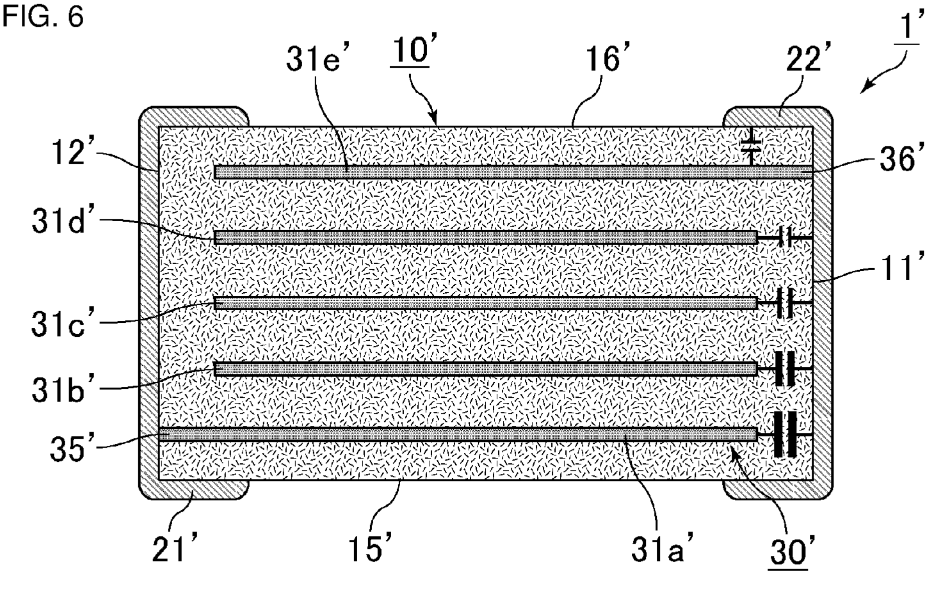
FIG. 6 is an L'T' sectional view schematically illustrating an internal structure of the multilayer coil component for comparison.

FIG. 6 is an UT' sectional view schematically illustrating an internal structure of the multilayer coil component for comparison.

The form illustrated in FIG. 6 is similar to that of FIG. 3, and the magnitude of the stray capacitance generated between each coil conductor and the second outer electrode 22' is indicated by a circuit symbol of a capacitor.

Among the coil conductors, excluding the coil conductor 31*e*' connected to the second outer electrode 22' by the extended conductor 36', the coil conductors 31*a*', 31*b*', 31*c*', and 31*d*' each are at the same distance from the second outer electrode 22', and are all close to the second outer electrode 22', therefore, the non-negligible stray capacitance is generated between each coil conductor and the second outer electrode 22'.

Further, since the potential of the coil conductor 31*a*' connected to the first outer electrode 21' by the extended conductor 35' is close to the potential of the first outer electrode 21', the potential difference between the coil conductor 31*a*' and the second outer electrode 22' is considerably large. Therefore, the stray capacitance between the coil conductor 31*a*' and the second outer electrode 22' becomes considerably large.

Similarly, since the potential difference between the coil conductor 31*b*' and the second outer electrode 22' is large, the stray capacitance between the coil conductor 31*b*' and the second outer electrode 22' is large. Further, since the potential difference between the coil conductor 31*c*' and the second outer electrode 22' is slightly large, the stray capacitance between the coil conductor 31*c*' and the second outer electrode 22' is slightly large.

As described above, in the multilayer coil component 1' for comparison, since there is a coil conductor having the large stray capacitance generated between the second outer electrode 22' and the coil conductor, the stray capacitance generated between the second outer electrode 22' and the coil conductor is large as a whole.

The stray capacitance generated between the first outer electrode 21' and the coil conductor is also large as a whole for the same reason.

For this reason, in the multilayer coil component in which the relationship between the length dimension L' of the multilayer body and the width dimension W which is the dimension in the width direction is L'/W'>1, the impedance characteristics in the high frequency region are insufficient.

In addition, the multilayer coil component of the present disclosure has excellent resistance to deflection of the multilayer coil component after the multilayer coil component is mounted.

As a force applied to the multilayer coil component when the substrate on which the multilayer coil component is mounted is bent, a force applied by three-point bending using a mounting position of the first outer electrode and a mounting position of the second outer electrode as supporting points at both ends is assumed.

In the multilayer coil component of the present disclosure, since the length dimension L of the multilayer body is smaller than the width dimension W, the distance between the mounting position of the first outer electrode and the mounting position of the second outer electrode, i. e., the distance between the supporting points in three-point bending, is small. Since the force applied by the three-point bending decreases as the distance between the supporting points decreases, breakage due to deflection of the multilayer coil component is prevented, so that the multilayer coil component can have high resistance to deflection.

On the contrary, in the multilayer coil component 1' for comparison as illustrated in FIG. 4, since the length dimension L' of the multilayer body is larger than the width dimension W, the distance between the mounting position of the first outer electrode and the mounting position of the second outer electrode is large, and the distance between the supporting points in three-point bending is large. Since the force applied by the three-point bending increases as the distance between the supporting points increases, breakage due to deflection of the multilayer coil component is likely to occur.

In the multilayer coil component of the present disclosure, it is preferable that a gap portion be provided between the insulating layer and the coil conductor.

Figure 7:
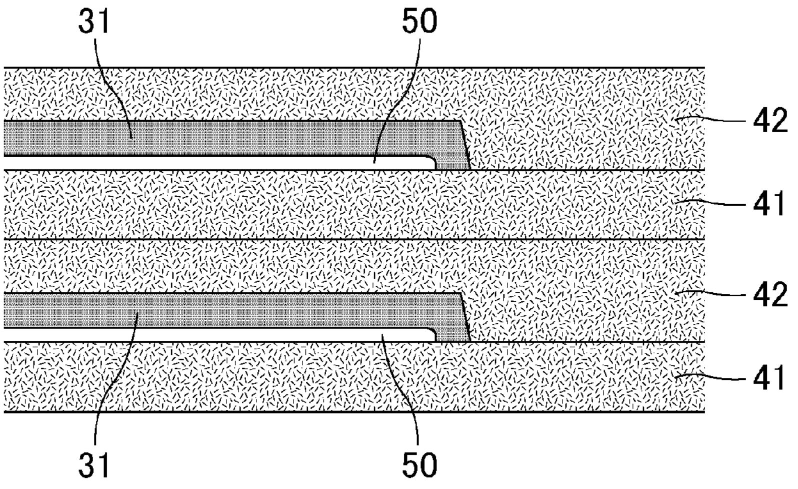
FIG. 7 is a sectional view schematically illustrating a formation position of a gap portion between an insulating layer and a coil conductor.

FIG. 7 is a sectional view schematically illustrating a formation position of a gap portion between an insulating layer and a coil conductor.

This sectional view corresponds to a cross-section taken along a plane parallel to the LW plane in FIG. 2.

FIG. 7 illustrates a configuration in which a coil conductor 31 and an insulating layer 42 are provided on an insulating layer 41, and a gap portion 50 is provided between the insulating layer 41 and the coil conductor 31.

The gap portion 50 is formed at a position slightly inward from an end portion of the coil conductor 31.

Since the ceramic material (ferrite) configuring the insulating layer contracts more than the metal material (silver) configuring the coil conductor at the time of sintering, an unnecessary force is applied between the ceramic material and the metal material, which causes deterioration of inductance and impedance of the multilayer coil component.

When the gap portion is provided between the insulating layer and the coil conductor, contact between the ceramic material and the metal material is reduced, and thus a force applied between the ceramic material and the metal material at the time of sintering is relaxed.

Therefore, it is possible to suppress deterioration of inductance and impedance of the multilayer coil component.

In the multilayer coil component of the present disclosure, the number of winding (number of turns) of the coil is preferably equal to or more than 2 and equal to or less than 10 (i.e., from 2 to 10).

The length of the multilayer coil component is preferably equal to or more than 0.65 mm and preferably equal to or less than 0.95 mm (i.e., from 0.65 mm to 0.95 mm).

The width of the multilayer coil component is preferably equal to or more than 1.45 mm, and preferably equal to or less than 1.75 mm (i.e., from 1.45 mm to 1.75 mm).

The height of the multilayer coil component is preferably equal to or more than 0.65 mm, and preferably equal to or less than 0.95 mm (i.e., from 0.65 mm to 0.95 mm).

Next, an example of a method for manufacturing the multilayer coil component of the present embodiment will be described.

Hereinafter, a method for producing a multilayer body by a printing lamination method will be described.

The printing lamination method is a method of forming a coil conductor extending in a lamination direction of a multilayer body by printing and laminating a conductive paste and a ceramic paste.

This method is different from a method in which a plurality of sheets provided with via conductors therein is produced by making holes with laser drilling on the sheet and filling the holes with a conductive paste and then the sheets are laminated.

Figure 8:
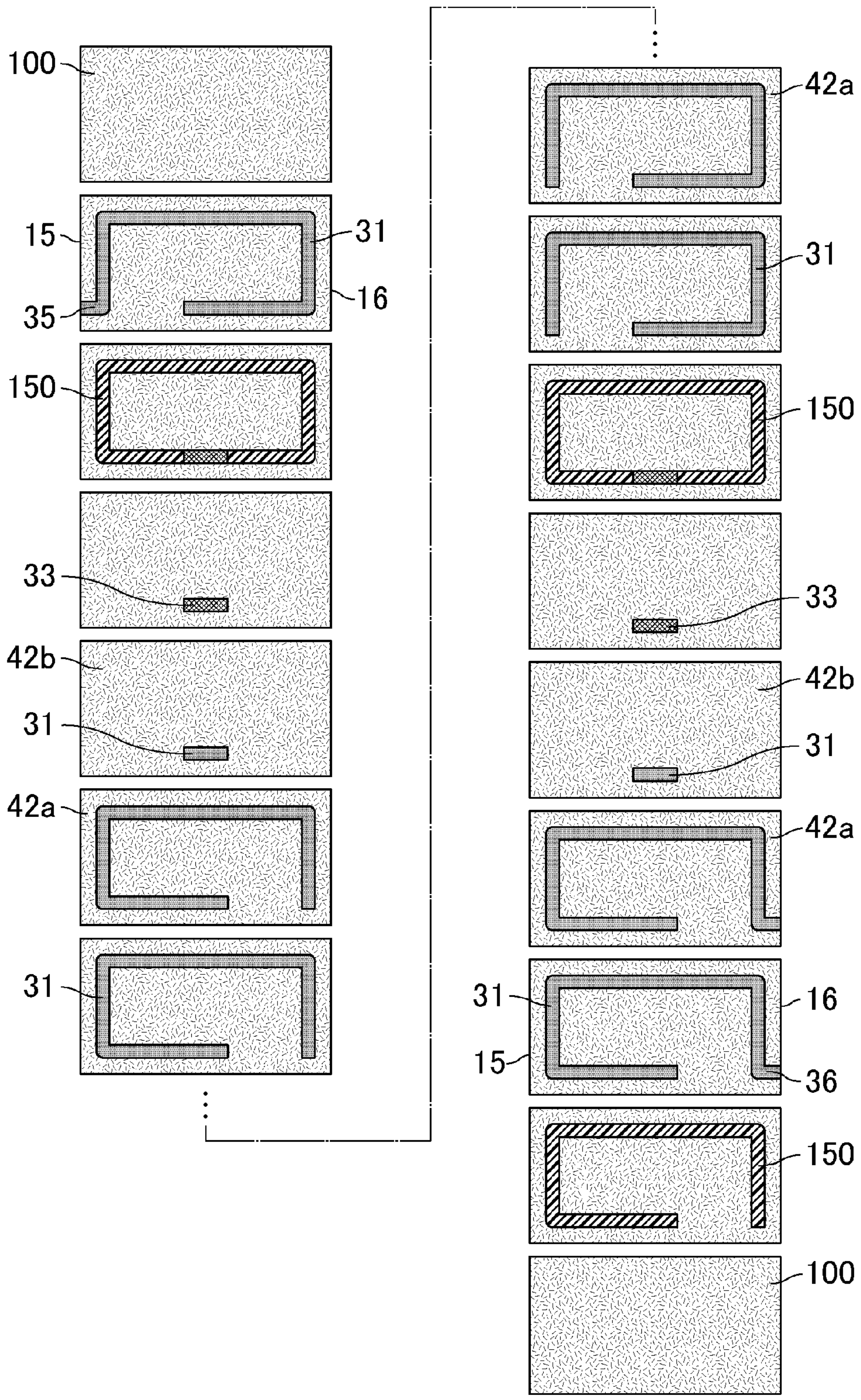
FIG. 8 is an exploded view schematically illustrating a method for producing a multilayer body by a printing lamination method.

FIG. 8 is an exploded view schematically illustrating a method for producing a multilayer body by a printing lamination method.

FIG. 8 illustrates a layer structure configuring a multilayer body produced by the printing lamination method.

In the printing lamination method, an outer layer 100, which is an insulating layer illustrated at the bottom of FIG. 8, is used as a base, and a conductive paste and a ceramic paste are printed in order so as to be in a state illustrated in an upper direction of the drawing.

The ceramic paste is a material that becomes an insulating layer by firing.

Each layer illustrated in FIG. 8 shows an upper surface state after printing, and each layer illustrated in FIG. 8 is not separately produced and laminated.

First, a ceramic paste, a conductive paste, and a resin paste are prepared as materials.

A ferrite paste is preferably used as the ceramic paste.

As the ferrite paste, it is preferable to use a ferrite material composed of equal to or more than 40 mol % and equal to or less than 49.5 mol % (i.e., from 40 mol % to 49.5 mol %) of Fe in terms of $Fe_2O_3$, equal to or more than 5 mol % and equal to or less than 35 mol % (i.e., from 5 mol % to 35 mol %) of Zn in terms of ZnO, equal to or more than 4 mol % and equal to or less than 12 mol % (i.e., from 4 mol % to 12 mol %) of Cu in terms of CuO, and equal to or more than 8 mol % and equal to or less than 42 mol % (i.e., from 8 mol % to 42 mol %) of Ni in terms of NiO. Trace additives (including inevitable impurities) such as Bi, Sn, Mn, and Co may be contained in the above-described materials.

Examples of a method for producing the ceramic paste include the following methods.

$Fe_2O_3$, ZnO, CuO, NiO, and additives as necessary are weighed so as to have a predetermined composition, put into a ball-mill, wet-mixed and pulverized, discharged, evaporated and dried, and then calcined at a temperature of equal to or higher than 700° C. and equal to or lower than 800° C. (i.e., from 700° C. to 800° C.) to obtain a calcined powder.

A predetermined amount of a solvent (such as a ketone-based solvent), resin (such as polyvinyl acetal), and a plasticizer (such as an alkyd-based plasticizer) are added to the calcined powder, kneaded with a planetary mixer, and further dispersed with a three-roll mill to produce a ferrite paste.

As the conductive paste, a paste containing silver as a conductive material is preferably used.

Examples of a method for producing the conductive paste include the following methods.

Silver powder is prepared, predetermined amounts of a solvent (such as eugenol), resin (such as ethyl cellulose), and a dispersant are added, and the mixture is kneaded with a planetary mixer and then dispersed with a three-roll mill to produce a conductive paste.

The resin paste is a paste for forming a resin layer between the ceramic paste and the conductive paste, and a gap is formed by burning off the resin layer after firing.

Examples of the method for producing the resin paste include the following methods.

Resin (such as an acrylic resin) that is burned out at the time of firing is contained in a solvent (such as isophorone), thereby producing a resin paste.

Since the printing lamination proceeds from the lower side to the upper side in the drawing, description will be made along the procedure.

First, a thermal release sheet and a base film are laminated on a metal plate, and a ceramic paste is printed a predetermined number of times to prepare an outer layer.

As the base film, a PET (polyethylene terephthalate) film can be suitably used.

The outer layer 100 is illustrated at the bottom of FIG. 8.

Next, a resin layer 150 is formed by printing a resin paste on the outer layer 100 so as to become a pattern illustrated second from the bottom of FIG. 8.

Preferably, the pattern of the resin layer 150 is substantially the same as a pattern of the coil conductor 31 to be formed later, and a line width of the resin layer 150 is slightly smaller than a line width of the coil conductor 31.

Next, the coil conductor 31 is formed by printing a conductive paste so as to have the pattern illustrated third from the bottom in FIG. 8. At the same time, the extended conductor 36 is formed.

The conductive paste is formed so as to cover the resin layer 150.

Subsequently, an insulating layer 42*a* is formed by printing a ceramic paste on a region where the extended conductor 36 and the coil conductor 31 are not formed. The insulating layer 42*a* is set to have substantially the same thicknesses as those of the extended conductor 36 and the coil conductor 31.

The pattern illustrated fourth from the bottom in FIG. 8 shows the upper surface after the insulating layer 42*a* is formed.

Further, an insulating layer 42*b* is formed by printing a ceramic paste, so that a part of the coil conductor 31 is exposed, on the other region of the part.

The pattern illustrated fifth from the bottom in FIG. 8 shows the upper surface after the insulating layer 42*b* is formed.

Subsequently, a connection conductor 33 for connecting the turns of the coil so as to be connected to an exposed portion, which is a part of the coil conductor 31, is formed by filling with the conductive paste.

The pattern illustrated sixth from the bottom in FIG. 8 shows the upper surface after the connection conductor 33 is formed.

Next, the resin layer 150 is formed by printing a resin paste so as to become the pattern illustrated seventh from the bottom of FIG. 8.

Preferably, the pattern of the resin layer 150 is substantially the same as the pattern of the coil conductor 31 to be formed later, and the line width of the resin layer 150 is slightly smaller than the line width of the coil conductor 31.

In addition, the resin layer 150 is formed so as not to cover the upper surface of the connection conductor 33.

Next, the coil conductor 31 is formed by printing a conductive paste so as to have the pattern illustrated eighth from the bottom of FIG. 8. The difference between the resin layer 150 and the connection conductor 33 is filled with the conductive paste so that the coil conductor 31 is electrically connected to the connection conductor 33.

Hereinafter, formation of an insulating layer, formation of a connection conductor, formation of a resin layer, and formation of a coil conductor are repeatedly performed to produce a multilayer body.

Finally, the coil conductor 31 and the extended conductor 35 are formed by printing the conductive paste so as to have the pattern illustrated second from the top of FIG. 8.

Further, a ceramic paste is printed a predetermined number of times so as to cover the entirety of the extended conductor 35 and the coil conductor 31, and thus the outer layer 100 is formed.

Next, after being pressure-bonded while being attached to the metal plate, cooling is performed, and the metal plate and the base film are peeled off in this order, whereby an aggregation (multilayer body block) in which a large number of elements having the above-described pattern are provided on one surface is obtained.

The multilayer body block is cut by a dicer or the like to be singulated into elements.

This element corresponds to one multilayer coil component.

The obtained element is subjected to barrel treatment, whereby corners of the element are cut and rounded. The barrel treatment may be performed on an unfired element or may be performed on a multilayer body after firing. Further, the barrel treatment may be either dry or wet. The barrel treatment may be a method of co-rubbing elements or a method of barrel treatment together with a medium.

After the barrel treatment, the element is fired at a temperature of equal to or higher than 910° C. and equal to or lower than 930° C. (i.e., from 910° C. to 930° C.) to obtain a multilayer body.

By firing the element, the resin layer is burned out, and a gap portion is formed between the insulating layer and the coil conductor (see FIG. 7).

After the firing, a paste containing a metal is applied to the multilayer body and baked to form a base electrode.

Subsequently, electrolytic plating is performed to sequentially form a Ni-coating and a Sn-coating on the base electrode, thereby forming a first outer electrode and a second outer electrode, and thus a multilayer coil component can be obtained.

The outer electrodes are formed at positions as illustrated in FIG. 1.

The outer electrode is formed so as to have the positional relationship illustrated in FIG. 1 with reference to the position where the connection conductor is exposed from the multilayer body.

A direction in which a dimension of the multilayer body is large is a width direction (W direction), and a lamination direction of the multilayer body and a direction of a coil axis are a length direction (L direction).

The surfaces opposing each other in the length direction are a first end surface and a second end surface. The first outer electrode is formed so as to cover the first end surface, and the second outer electrode is formed so as to cover the second end surface.

The first outer electrode is electrically connected to the coil conductor on a first side surface, and the second outer electrode is electrically connected to the coil conductor on a second side surface.

EXAMPLES

Hereinafter, an example of the multilayer coil component according to the present disclosure will be described in more detail. Note that the present disclosure is not limited to this example.

Example 1

<Preparation of Ceramic Paste>

$Fe_2O_3$, ZnO, CuO, NiO, and additives as necessary were weighed so as to have a predetermined composition, placed in a ball-mill, wet-mixed and pulverized, discharged, evaporated and dried, and then calcined at a temperature of 750° C. to obtain a calcined powder.

Predetermined amounts of a solvent (such as a ketone-based solvent), resin (such as polyvinyl acetal), and a plasticizer (such as an alkyd-based plasticizer) were added to the calcined powder, kneaded with a planetary mixer, and further dispersed with a three-roll mill to prepare a ferrite paste.

The ferrite paste contains a ferrite material composed of 45 mol % of Fe in terms of $Fe_2O_3$, 30 mol % of Zn in terms of ZnO, 10 mol % of Cu in terms of CuO, and 15 mol % of Ni in terms of NiO.

<Preparation of Conductive Paste>

Silver powder was prepared, predetermined amounts of a solvent (such as eugenol), resin (such as ethyl cellulose), and a dispersant were added, and the mixture was kneaded with a planetary mixer and then dispersed with a three-roll mill to prepare a conductive paste.

<Preparation of Resin Paste>

An acrylic resin is contained in a solvent (isophorone), whereby a resin paste was prepared.

<Production of Multilayer Body>

According to the procedure illustrated in FIG. 8, a multilayer body was produced using the printing lamination method.

The produced multilayer body has a gap portion between the insulating layer and the coil conductor.

The multilayer body has a rectangular parallelepiped shape with a large dimension in one direction and with a small dimension and the same dimension in two directions.

A direction in which the dimension of the multilayer body is large is defined as a width direction (W direction), and a lamination direction of the multilayer body and a direction of a coil axis are defined as a length direction (L direction). A direction orthogonal to the width direction and the length direction is defined as a height direction (T direction).

Surfaces opposing each other in the length direction are referred to as a first end surface and a second end surface.

Surfaces opposing each other in the width direction are referred to as a first side surface and a second side surface, and surfaces opposing each other in the height direction are referred to as a first main surface and a second main surface.

<Formation of Outer Electrode>

A paste containing metal and glass was applied to the first end surface and the second end surface of the multilayer body, and baked to form a base electrode.

Subsequently, electrolytic plating was performed to sequentially form a Ni-coating and a Sn-coating on the base electrode.

A first outer electrode was formed so as to cover the first end surface, and a second outer electrode was formed so as to cover the second end surface, thereby obtaining a multilayer coil component.

The shape of the multilayer coil component was the shape illustrated in FIG. 1, and the size of the multilayer body was L=0.8 mm, W=1.6 mm, and T=0.8 mm.

Comparative Example 1

With respect to the same multilayer body produced in Example 1, the formation location of the outer electrode was changed. A multilayer coil component was produced in the same manner as above except for the formation location.

The shape of the multilayer coil component was the shape illustrated in FIG. 4, and the size of the multilayer body was L=1.6 mm, W=0.8 mm, and T=0.8 mm.

Although the multilayer body itself is the same as that of Example 1, the length direction and the width direction are opposite to each other because the surface on which the outer electrode is formed is different. The outer electrodes are formed on surfaces having dimensions of 0.8 mm×0.8 mm, and the surfaces on which the outer electrodes are formed are the first end surface and the second end surface. Since the direction in which the first end surface and the second end surface face each other is the length direction, the length dimension L is 1.6 mm

[Evaluation]

The multilayer coil components of Example 1 and Comparative Example 1 were evaluated as follows.

<Impedance Measurement>

For the multilayer coil components of Example 1 and Comparative Example 1, impedance characteristics in 1

MHz to 1000 MHz were measured using an impedance analyzer (model number E4991A) manufactured by Agilent Technologies, Inc.

Figure 9:
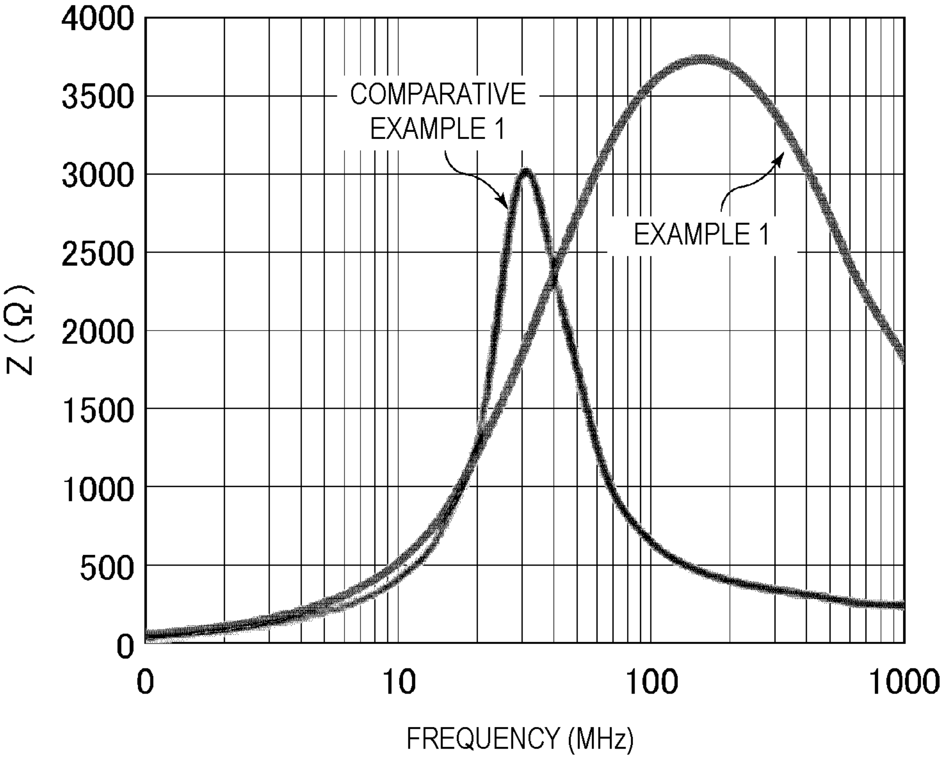
FIG. 9 is a graph showing impedance characteristics of the multilayer coil components of Example 1 and Comparative Example 1.

FIG. 9 is a graph showing impedance characteristics of the multilayer coil components of Example 1 and Comparative Example 1.

As compared with Comparative Example 1, in Example 1, the peak of the impedance is shifted to the high frequency side by about 100 MHz, and it can be seen that the multilayer coil of Example 1 is excellent in high-frequency characteristics.

<Simulation of Deflection Stress>

The maximum stress (deflection stress) applied to the multilayer coil component when the multilayer coil component was mounted on the substrate was evaluated by simulation.

Specifically, from the thermal expansion coefficients of the multilayer coil component and the mounting substrate, evaluation was performed at an environmental temperature of 125° C. using finite element method analysis software (Femtet (registered trademark) manufactured by Murata Software Co, Ltd).

A multilayer coil component was mounted on the central portion of a mounting substrate having a size of 100 mm×40 mm and a thickness of 0.8 mm, and simulation was performed under the condition that the deflection of 3 mm was applied.

The maximum stresses generated in the multilayer coil component were evaluated, the maximum stresses were 808 MPa in Comparative Example 1 and 602 MPa in Example 1, and it was found that the multilayer coil component of Example 1 can reduce the deflection stresses by about 25%.

What is claimed is:

1. A multilayer coil component comprising:

a multilayer body configured by a plurality of insulating layers laminated together and a coil inside the multilayer body, the coil being configured by electrically connecting a plurality of coil conductors laminated together with the insulating layers; and a first outer electrode and a second outer electrode that are electrically connected to the coil, wherein the multilayer body has a first end surface and a second end surface opposing each other in a length direction in which the first outer electrode and the second outer electrode face each other, a first main surface and a second main surface opposing each other in a height direction orthogonal to the length direction, and a first side surface and a second side surface opposing each other in a width direction orthogonal to the length direction and the height direction, the second main surface is a mounting surface, a lamination direction of the multilayer body and a coil axis of the coil are along the length direction, a relationship between a length dimension L, which is a dimension of the multilayer body in a length direction, and a width dimension W, which is a dimension of the multilayer body in a width direction, is $L/W<1$, the coil conductor is connected to a portion of the first outer electrode that overlaps a portion of the first side surface, and the coil conductor is connected to a portion of the second outer electrode that overlaps a portion of the second side surface.

2. The multilayer coil component according to claim 1, wherein the relationship between the length dimension L and the width dimension W is $L/W\leq 0.7$.

3. The multilayer coil component according to claim 2, wherein the relationship between the length dimension L and a height dimension T, which is a dimension of the multilayer body in a height direction, is $L/T\geq 0.7$ and $L/T\leq 1.3$.

4. The multilayer coil component according to claim 2, wherein a gap portion is present between the insulating layer and the coil conductor.

5. The multilayer coil component according to claim 3, wherein a gap portion is present between the insulating layer and the coil conductor.

6. The multilayer coil component according to claim 1, wherein the relationship between the length dimension L and a height dimension T, which is a dimension of the multilayer body in a height direction, is $L/T\geq 0.7$ and $L/T\leq 1.3$.

7. The multilayer coil component according to claim 6, wherein a gap portion is present between the insulating layer and the coil conductor.

8. The multilayer coil component according to claim 1, wherein a gap portion is present between the insulating layer and the coil conductor.

9. A multilayer coil component comprising:

a multilayer body configured by a plurality of insulating layers laminated together and a coil inside the multilayer body, the coil being configured by electrically connecting a plurality of coil conductors laminated together with the insulating layers; and a first outer electrode and a second outer electrode that are electrically connected to the coil, wherein the multilayer body has a first end surface and a second end surface opposing each other in a length direction in which the first outer electrode and the second outer electrode face each other, a first main surface and a second main surface opposing each other in a height direction orthogonal to the length direction, and a first side surface and a second side surface opposing each other in a width direction orthogonal to the length direction and the height direction, the second main surface is a mounting surface, a lamination direction of the multilayer body and a coil axis of the coil are along the length direction, a relationship between a length dimension L, which is a dimension of the multilayer body in a length direction, and a width dimension W, which is a dimension of the multilayer body in a width direction, is $L/W<1$, and a gap portion is present between a portion the insulating layer and a portion of the coil conductor such that the portion of the insulating layer and the portion of the coil conductor define the gap portion, and another portion of the coil conductor contacts another portion of the insulating layer adjacent to the portion of the insulating layer.

* * * * *